United States Patent [19]
Barcza

[11] Patent Number: 5,245,823
[45] Date of Patent: Sep. 21, 1993

[54] EXTERNAL FLAP VECTORING MECHANISM

[75] Inventor: William K. Barcza, Stuart, Fla.

[73] Assignee: United Technologies Corporation, Hartford, Conn.

[21] Appl. No.: 763,690

[22] Filed: Sep. 23, 1991

[51] Int. Cl.⁵ .............................................. F02K 1/00
[52] U.S. Cl. ...................................... 60/228; 60/230; 60/232; 60/271; 239/265.35; 239/265.39
[58] Field of Search .................. 60/228, 230, 232, 271; 239/265.35, 265.41, 265.39

[56] References Cited

U.S. PATENT DOCUMENTS

| | | |
|---|---|---|
| 3,814,325 | 6/1974 | McCardle, Jr. et al. ...... 239/265.39 |
| 3,981,450 | 9/1976 | McCardle, Jr. et al. ............. 60/230 |
| 3,988,889 | 11/1976 | Chamay et al. ........................ 60/271 |
| 4,994,660 | 2/1991 | Hauer ............................. 239/265.39 |
| 5,082,182 | 1/1992 | Bruchez, Jr. et al. ......... 239/265.35 |

Primary Examiner—Richard A. Bertsch
Assistant Examiner—Howard R. Richman

[57] ABSTRACT

An external flap vectoring mechanism on an axisymmetric gas turbine exhaust nozzle, the external flap vectoring mechanism comprising a plurality of external flaps, each such flap having first and second flaps, the first flap pivotably connected to a sync ring and the second flap pivotably connected to the aft end of the first flap thereby providing for lateral movement of the second flap relative to the first.

7 Claims, 4 Drawing Sheets

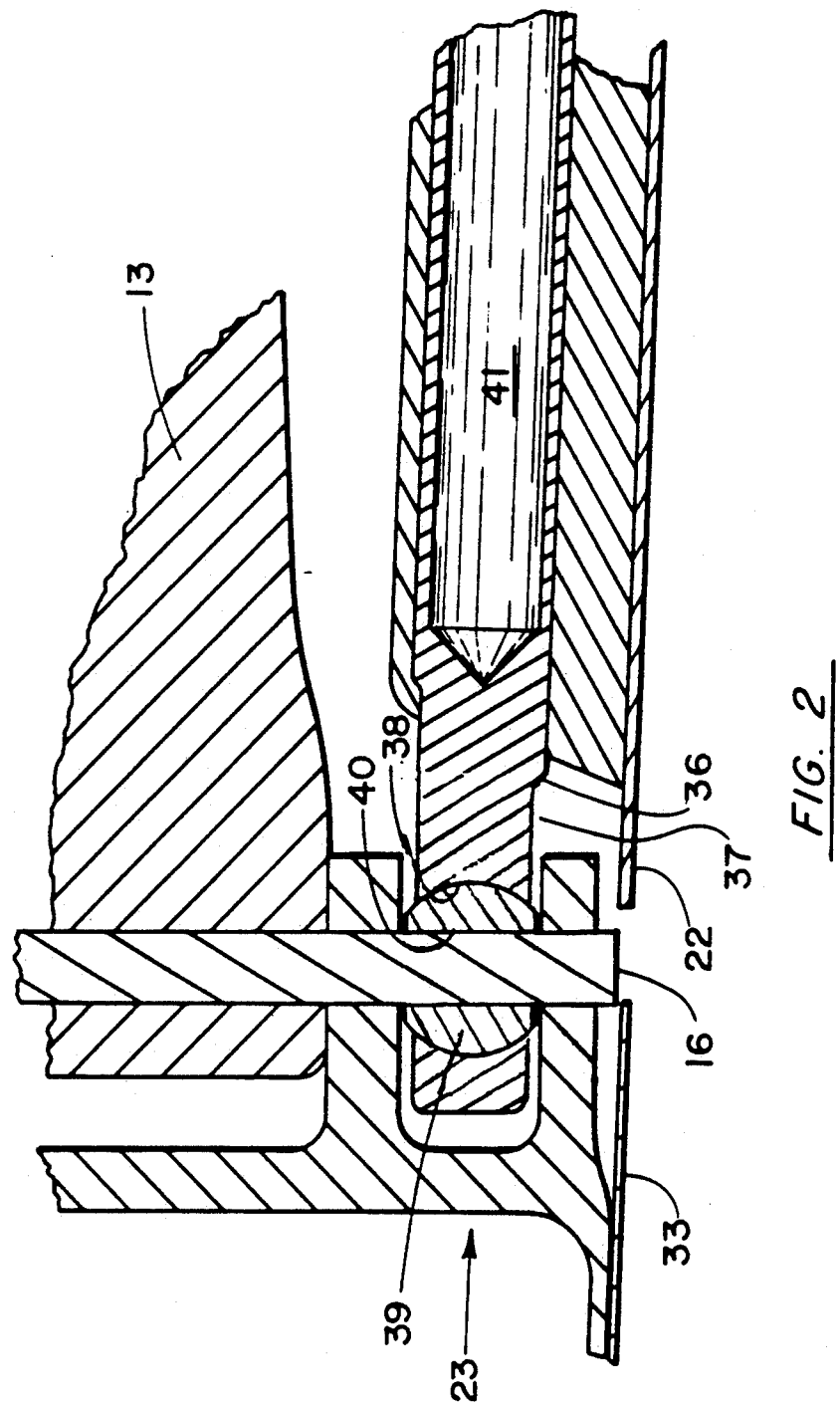

EXTERNAL FLAP VECTORING MECHANISM

DESCRIPTION

1. Field of the Invention

This invention relates to exhaust nozzles for gas turbine engines.

2. Background Art

One of the goals of designers of high performance gas turbine aircraft engines has been to achieve thrust vectoring exhaust nozzles. While this goal has been somewhat achieved through the use of "two-dimensional" nozzles, such nozzles are substantially heavier and more expensive than the variable exit area axisymmetric nozzles that they are intended to replace. Heretofore designers have been unable to produce thrust vectoring from an axisymmetric exhaust nozzle without significantly increasing the cost and weight of the axisymmetric nozzle, as well as the complexity thereof.

What is needed is a mechanism to provide selective positioning of the divergent flaps of an axisymmetric exhaust nozzle to produce thrust vectoring without significantly increasing the weight and complexity thereof.

3. Disclosure of the Invention

According to the present invention, the foregoing and other objects are attained by providing a plurality of external vectoring flaps which selectively position the divergent flaps. Each external flap is divided into a first flap and a second flap. The forward end of the first flap is pivotably connected to a sync-ring which is rotatable about a first axis, and the aft end of the second flap is pivotably connected to a divergent flap which is rotatable about a second axis that is parallel to and offset from the first axis.

The aft end of the first flap is pivotably connected to the forward end of the second flap, thereby providing for lateral movement of the second flap and the divergent flap connected thereto. A support strut may be pivotably connected at one end to the aft end of the first flap, and pivotably connected at the other end to the divergent flap which the second flap is connected to. The resulting linkage between the sync-ring and the divergent flap is such that angular displacement of the sync-ring about the first axis causes a larger angular displacement of the divergent flap about the second axis, thus providing selective positioning of the divergent flaps.

The foregoing and other features and advantages of the present invention will become more apparent from the following description and accompanying drawings.

BRIEF DESCRIPTION OF DRAWINGS

FIG. 2 is an enlarged view of the area of FIG. 1 bounded by line 2—2.

BEST MODE FOR CARRYING OUT THE INVENTION

Figure 1:
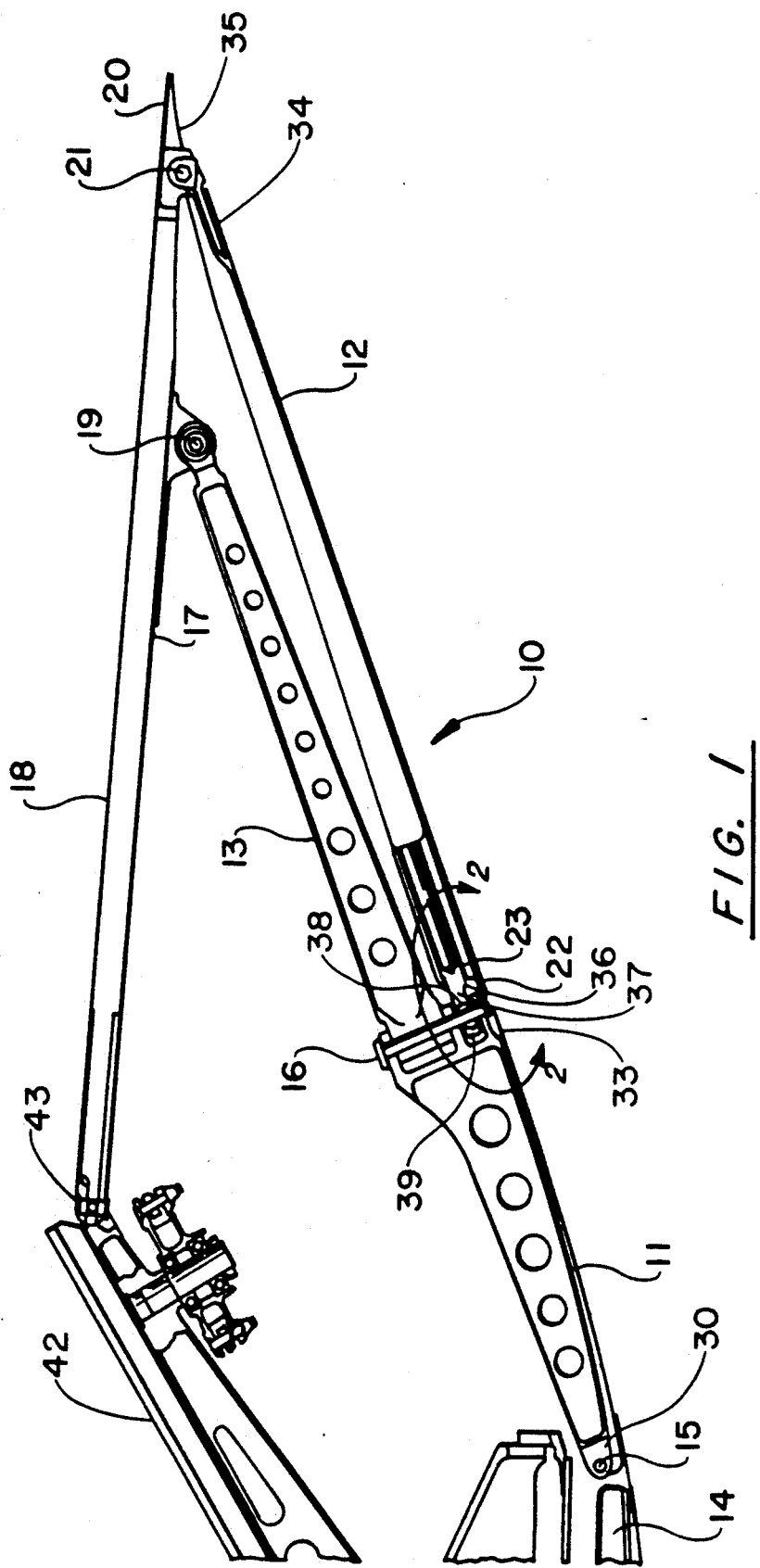
FIG. 1 is a cross-sectional taken along line 1—1 of FIG. 3 showing a gas turbine exhaust nozzle incorporating the external flap vectoring mechanism of the present invention.
Figure 3:
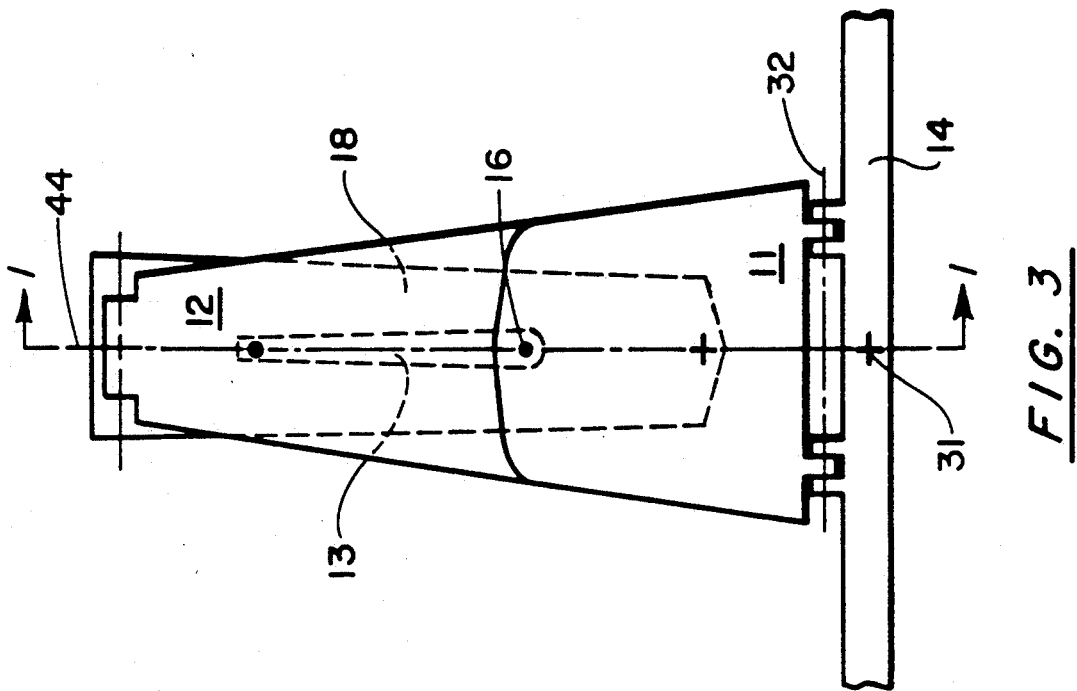
FIG. 3 is a plan view of one of the external flaps as viewed from exterior of the exhaust nozzle.

The preferred embodiment of the present invention includes a plurality of external vectoring flaps 10, one of which is shown in cross-section in FIG. 1. Each external vectoring flap 10 includes a first flap 11 and a second flap 12, the first flap 11 having a support strut 13 connected thereto. The forward end 30 of the first flap 11 is pivotably connected to a sync-ring 14, a portion of which is shown in FIGS. 1 and 3.

The sync-ring 14 is rotatably secured within the exhaust nozzle, and is rotatable about a plurality of first axes which extend through the center of the sync-ring. One such first axis 31 is shown extending into the page in FIGS. 3 and 4. The sync-ring pins 15 of each external flap are aligned along a second axis 32 which is perpendicular to at least one of the first axes 31.

A support strut 13 is connected to the aft end 33 of the first flap 11 by a forward strut pin 16 perpendicularly oriented with respect to the second axis 32. The aft end of the support strut 13 is pivotably connected to the exterior surface 17 of the divergent flap 18 by an aft strut pin 19. The divergent flap 18 is in turn connected to the aft end of one of the convergent flaps 42 by a universal hinge 43.

The aft end 34 of the second flap 12 is pivotably connected to the external surface 17 of the divergent flap 18 adjacent the trailing edge 35 thereof by a divergent flap pin 21. In the preferred embodiment, a spherical bearing hinge and slider assembly 23 is secured to the forward end 22 of the second flap 22. The spherical bearing hinge and slider assembly 23, an enlarged view of which is shown in FIG. 2, includes an extension or rod 36, one end 37 of which has a spherical bearing race 38 therein. A spherical bearing 39 received within the spherical bearing race 38 has a bore 40 through which the forward strut pin 16 extends. The forward strut pin 16 thus secures the spherical bearing hinge and slider assembly 23 to the first flap 11.

The rod 36 is slidably received within the forward end 22 of the second flap 12, and for weight considerations the rod 36 is hollow, having a bore 41 therein. The rod 36 thus provides for translational movement of the second flap 12 while the spherical bearing 39 provides for twisting of the second flap about the pin 16. As those skilled in the art will readily appreciate, as long as the combined lengths of rod 36 and the second panel 12 are greater than the combined lengths of the support strut 13 and the portion of the divergent flap 18 between the aft strut pin 19 and the divergent flap pin 21, the second flap 12 will be retained by the spherical bearing hinge and slider assembly 23 at all operating positions of the divergent flap 18.

FIG. 3 shows a plan view of one of the external vectoring flaps 10 in relation to the divergent flap 18 attached thereto and the sync-ring 14. In unvectored position of the vectoring flap of FIG. 3, the first flap 11, the second flap 12, and the divergent flap 18 are all aligned along a reference centerline 44. It is important to understanding the present invention to note that since the divergent flap pin 21 hinges the second flap 12 to the divergent flap 18, the second flap 12 and the divergent flap 18 are always aligned with each other. The support strut 13, is also constrained to always be aligned with the second flap 12 and the divergent flap 18, since the strut 13 is connected at one end to the divergent flap 18 and at the other end, to the same strut pin 16 that secures the spherical bearing hinge and slider assembly 23 that retains the second flap 12.

Figure 4:
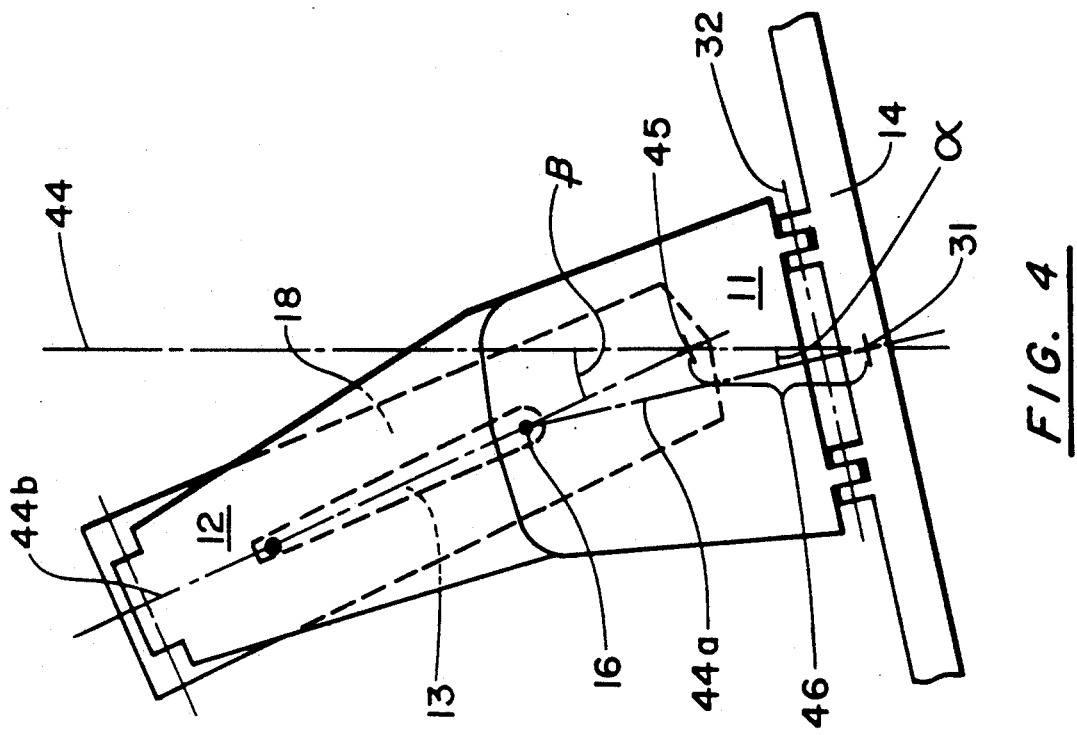
FIG. 4 is a plan view of the external flap of FIG. 3 shown in a vectored position.

By rotating or tilting the spherical sync-ring 14 about the first axis 31 such that the centerline 44a of the first flap 11 is at an angle α to the reference centerline 44, as shown in FIG. 4, the aft end 33 of the first flap 11 is displaced to one side of the reference centerline 44, thereby displacing the forward end of the support strut 13 and the strut pin 16 therein. As those skilled in the art will readily appreciate, this movement tends to rotate the divergent flap 18 about a third axis 45 which is parallel to and offset from the first axis 31, but since the distance from the strut pin 16 to the first axis 31 is greater than the distance from the strut pin 16 to the third axis 45, the centerline 44b of the divergent flap 18 rotates through an angle β from the reference centerline 44 that is significantly greater than the angle α, swinging the divergent flap 18 laterally. Using the external flap 10 shown in FIG. 4 as a zero degree reference, a second external flap positioned 180 degrees around the sync-ring 14 and facing the first external flap 10 would also rotate through an angle equal in magnitude to β, swinging the second divergent flap laterally in the same direction as the divergent flap 18 of FIG. 4.

A third external flap positioned at 90 degrees to the right of the first external flap 10 would swing radially inward toward the exhaust flow in response to the aftward movement of the portion of the sync-ring 14 to the right of the first axis 31. Likewise, a fourth external flap positioned 90 degrees to the left of the first external flap 10 would swing radially outward away from the exhaust flow in response to the forward movement of the portion of the sync-ring 14 to the left of the first axis 31. Additional external flaps interposed between the first, second, third and fourth external flaps experience a combination of radial and lateral movement which complements the thrust vectoring of the four external flaps. It is to be understood that the present invention is described in terms of a nozzle having four flaps positioned 90 degrees apart for the purpose of explanation only, as the present invention is clearly not limited to this configuration.

Figure 5:
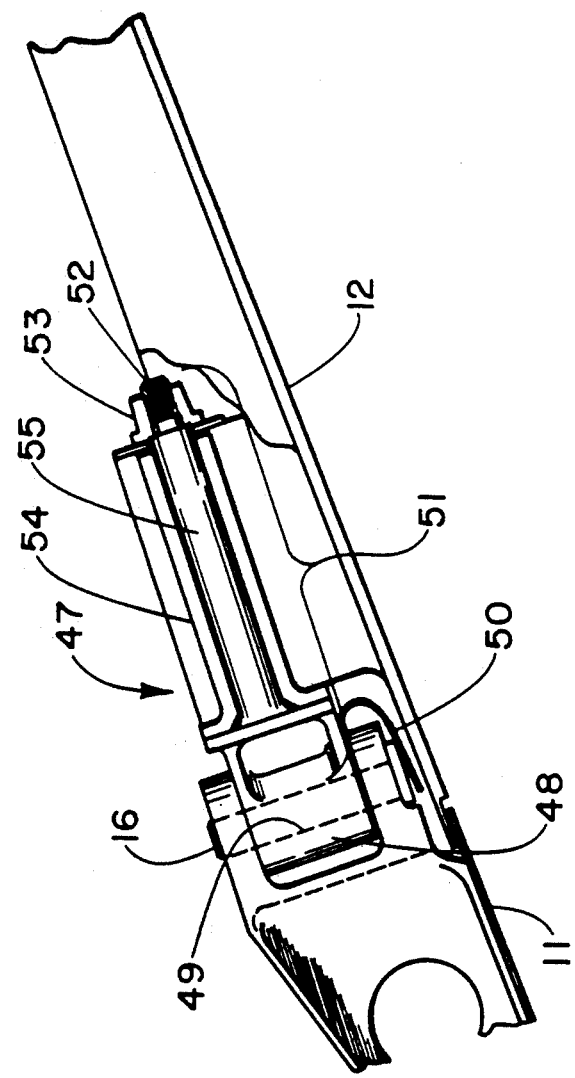
FIG. 5 is shows an alternate hinge assembly for connecting the first and second flaps.

In the preferred embodiment, the second flap 12 does not bear the load of the divergent flap 18 due to the presence of the slider assembly 23. As an alternate embodiment of the present invention, the support strut 13 can be eliminated altogether by carrying the load of the divergent flap 18 through the second flap 12. This can be accomplished by replacing the spherical bearing hinge and slider assembly 23 with the twisting hinge assembly 47 shown in FIG. 5.

The twisting hinge assembly 47 includes a base 48 having a bore 49 through which the strut pin 16 extends thereby pivotably connecting the base 48 to the aft end 33 of the first flap 11. The strut pin 16 may be inverted and secured by a locking strip 50 for ease of assembly. An extension 51 extends aftward from the base 48, and is threaded at its distal end 52 to receive a nut 53 which connects the extension 51 to the second flap 12.

The second flap 12 is modified to include a sleeve member 54 in which a shaft 55 of the extension 51 is rotatably received. The shaft 55 is perpendicular to the bore 49. While the nut 53 retains the shaft 55 within the sleeve member 54, the sleeve member 54 is free to rotate about the shaft 55 of the extension 51.

As those skilled in the art will readily appreciate, the twisting hinge assembly 47 provides for twisting of the second flap 12 about the shaft 55 as well bearing of the load of the divergent flap 18 by the second flap 12. As a further embodiment of the present invention, since the twisting of the second flap 12 about the shaft 55 is of relatively small magnitude, the extension 51 can be made of a flexible material which can withstand such flexure. Such a design obviates the need for the shaft 55 and the sleeve member 54. The extension can then be connected directly to the second flap 12, and the second flap 12 is thereby free to twist about an axis perpendicular to the pin 16.

Although this invention has been shown and described with respect to a detailed embodiment thereof, it will be understood by those skilled in the art that various changes in form and detail thereof may be made without departing from the spirit and scope of the claimed invention.

I claim:

1. An external flap positioning assembly for selectively positioning divergent flaps of an axisymmetric gas turbine engine exhaust nozzle, said assembly comprising:

a sync-ring having a center and rotatably secured within said nozzle;

a plurality of convergent flaps, each convergent flap pivotably connected to a first end of one of the divergent flaps; and, a plurality of external flaps, each external flap including a first flap having first and second ends, the first end of the first flap pivotably connected to the sync-ring, a second flap having first and second ends, the second end of the second flap connected to a second end of one of the divergent flaps opposite the first end thereof at a first connection point, and means for pivotably connecting the second end of the first flap to the first end of the second flap.

2. The external flap positioning assembly of claim 1 wherein each of said first flaps is rotatable about first and second axes of rotation, said first axis of rotation extending through said center, and said second axis of rotation perpendicular to said first axis.

3. The external flap positioning assembly of claim 2 wherein said one of the divergent flaps has a third axis of rotation parallel to and offset from the first axis.

4. The external flap positioning assembly of claim 3 wherein the means for pivotably connecting the second end of the first flap to the first end of second flap comprises a strut having first and second ends separated by a first length, said first end of said strut pivotably connected to said one of the divergent flaps at a second connection point a second length from said first point, the second end of said strut pivotably connected to the second end of the first flap by a pin, said pin perpendicular to said second axis, and a spherical bearing assembly including a rod having first and second rod ends separated by a third length, said first rod end having a spherical bearing race therein, a spherical bearing received within said spherical bearing race, said spherical bearing having a bore extending therethrough, said pin extending through said bore, said second rod end slidably received within the first end of the second flap, wherein the first and the second ends of the second flap are separated by a fourth length and the sum of the first and second lengths is less than the sum of the third and fourth lengths, thereby retaining the second rod end within the first end of the second flap.

5. The external flap positioning assembly of claim 3 wherein the means for pivotably connecting the second end of the first flap to the first end of second flap comprises a hinge member including a base having a first bore extending therethrough, said base pivotably connected to the second end of the first flap by a pin secured thereto, said pin perpendicular to said second axis and extending through said first bore, and an extension extending from the base, said extension connected to the second flap.

6. The external flap positioning assembly of claim 5 wherein the extension comprises a shaft extending toward said second flap, said shaft perpendicular to said first bore and the second flap further comprises a sleeve member incorporated into the first end thereof, said sleeve member having a second bore extending therethrough, said shaft rotatably received within said second bore, said shaft threaded at one end to receive a nut thereon to retain said shaft within said sleeve.

7. The external flap positioning assembly of claim 5 wherein the extension is flexible, thereby providing for the second flap to twist about a fourth axis perpendicular to the pin.

* * * * *

UNITED STATES PATENT AND TRADEMARK OFFICE
CERTIFICATE OF CORRECTION

PATENT NO. : 5,245,823

DATED : September 21, 1993

INVENTOR(S) : William K. Barcza

It is certified that error appears in the above-identified patent and that said Letters Patent is hereby corrected as shown below:

In column 2, line 32, change "second flap 22" to --second flap 12--.

Signed and Sealed this

Twenty-third Day of August, 1994

Attest:

BRUCE LEHMAN

Attesting Officer

Commissioner of Patents and Trademarks